United States Patent [19]
Gilman

[11] Patent Number: 5,789,883
[45] Date of Patent: Aug. 4, 1998

[54] PULSE DURATION MODULATED SWITCHED RELUCTANCE MOTOR CONTROL

[75] Inventor: Robert E. Gilman, Elk River, Minn.

[73] Assignee: Honeywell Inc., Minneapolis, Minn.

[21] Appl. No.: 722,402

[22] Filed: Sep. 30, 1996

[51] Int. Cl.$^6$ .................. H02P 8/00; H02P 6/02
[52] U.S. Cl. ............ 318/254; 318/701; 318/138; 318/439
[58] Field of Search ................. 318/138, 139, 318/245, 254, 700–797

[56] References Cited

U.S. PATENT DOCUMENTS

| | | | |
|---|---|---|---|
| 4,239,217 | 12/1980 | Horst | 310/51 |
| 4,595,865 | 6/1986 | Jahns | 318/254 |
| 4,777,419 | 10/1988 | Obradovic | 318/696 |
| 4,896,089 | 1/1990 | Kliman et al. | 318/701 |
| 5,075,610 | 12/1991 | Harris . | |
| 5,115,181 | 5/1992 | Sood | 318/701 |
| 5,140,243 | 8/1992 | Lyons et al. | 318/701 |
| 5,140,244 | 8/1992 | Lyons et al. | 318/701 |
| 5,166,591 | 11/1992 | Stephens et al. | 318/701 |
| 5,196,775 | 3/1993 | Harris et al. . | |
| 5,373,206 | 12/1994 | Lim | 310/68 B |
| 5,386,162 | 1/1995 | Horst | 310/51 |
| 5,446,539 | 8/1995 | Horst | 318/701 |
| 5,530,333 | 6/1996 | Turner | 318/701 |
| 5,548,196 | 8/1996 | Lim | 318/701 |
| 5,563,488 | 10/1996 | Stephenson et al. | 318/701 |
| 5,627,444 | 5/1997 | Fulks | 318/701 |

FOREIGN PATENT DOCUMENTS

| WO 9016111A | 12/1990 | WIPO . |
|---|---|---|
| WO 9428618A | 12/1994 | WIPO . |

*Primary Examiner*—Paul Ip
*Attorney, Agent, or Firm*—John G. Shudy, Jr.

[57] ABSTRACT

A method and apparatus for exciting and controlling a switched reluctance motor having pulse duration modulated current provided to the windings of the motor. A start signal determined by a rotor position sensor, charges a capacitor. The capacitor is discharged according to an error signal that indicates the difference between a desired magnitude of a parameter, such as torque or speed, and the actual magnitude. A comparator puts out a pulse having a duration which is the same as the time that the capacitor has a charge. The pulse from the comparator turns on a switch connected to respective windings of the motor and provides a current pulse that has a duration equivalent to that of the pulse from the comparator. This sequence is repeated for all of the windings of the motor so as to maintain its speed or torque at the desired magnitude.

5 Claims, 7 Drawing Sheets

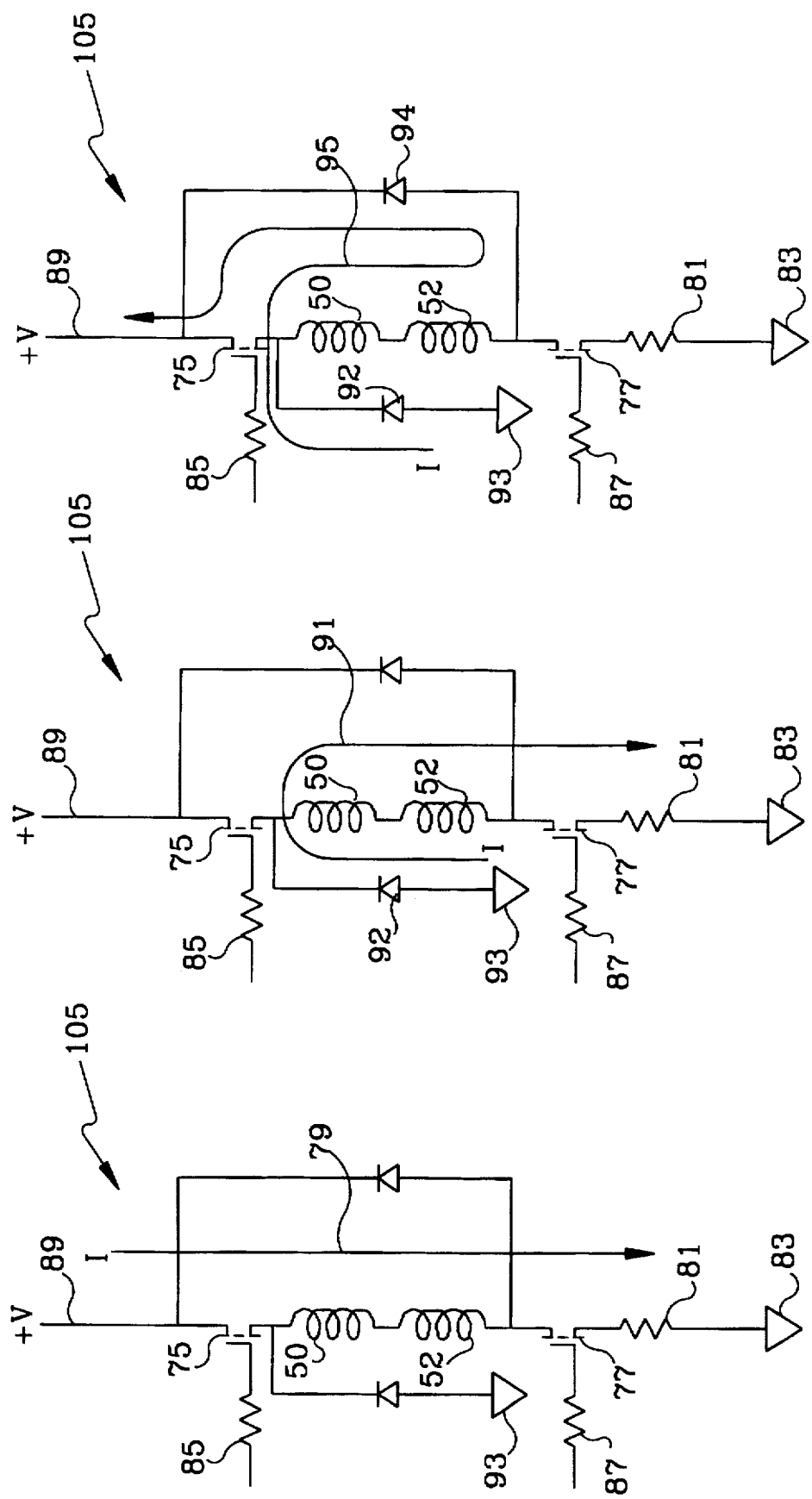

PULSE DURATION MODULATED SWITCHED RELUCTANCE MOTOR CONTROL

BACKGROUND OF THE INVENTION

The present invention pertains to motor controllers for variable speed and variable torque electric motors, such as switched reluctance (SR) motors, but is not limited to such motors; and it particularly pertains to improvements in controlling the pulse width duration modulation (PDM) of the power drive signals that determine the speed and torque of variable speed electric motors.

Developments in power semiconductor devices such as power MOSFETs and insulated gate bipolar transistors (IGBT's) have led to the development of electronically commutated motors for use in applications requiring variable speed drive motors. Common examples of the types of electric motors in which the speed and torque are controlled by controllers which pulse width modulate the current flow through the power phase winding circuits of such motors, are SR motors and PM motors; however, the controller can be used with any electric motor that can be controlled by pulse width modulating the flow of electrical current through the motor's power phase windings. The cost and reliability of the pulse width modulation (PWM) controllers for electric motors compare favorably with those of more conventional controllers for variable speed motors. The present PDM controllers offer even more advantages as noted below.

SR motors conventionally have multiple poles on both the stator and rotor. Each pole of each pair of diametrically opposite stator poles of a SR motor has series connected windings that form an independent power phase winding.

Torque to rotate the rotor is produced by switching current into each of the power phase windings in a predetermined sequence that is synchronized with the angular position of the rotor, to polarize an associated pair of stator poles. While generally the power phase windings are placed on poles of the stator, they can be placed on poles of the rotor if so desired. The resulting magnetic force attracts the nearest pair of rotor poles. In the SR motor, current is switched off in each power, or stator, phase winding before the poles of the rotor nearest the excited stator poles rotate past the aligned position. In such motors, the torque developed, while a function of the magnitude of the current flow in the stator windings, is independent of the direction of current flow so that unidirectional current pulses synchronized with the rotation of the rotor can be applied to the stator power phase windings by a converter using unidirectional current switching elements such as thyristors or power transistors. The desired commutation of current through the stator phase windings can be accomplished by producing a rotor position signal by means of a shaft position sensor; i.e., an encoder, or resolver, for example, which is driven by the motor's rotor. The rotor position signal is applied to the motor controller.

The motor controller also typically has applied to it a signal indicating the desired direction of rotation of the rotor and a speed set signal indicating the desired angular velocity of the rotor which is typically measured in revolutions per minute (RPM). Such speed and direction signals are controlled by a human operator, or an automated control system. In addition, a rotor position signal, which is also known as the motor electrical (Me) signal; and a torque, or current, feedback signals are also applied to the motor controller. Current for each of the power phase windings of the SR motor is derived from a unidirectional power source, and each of the power phase windings is connected in series with a power transistor to control the flow of current through its associated power phase winding. The motor controller produces pulse width modulation power drive signals which are applied to the power transistors to turn them on and off. The timing of such current flows relative to the position of the rotor causes the rotor to rotate, and the order in which the power phase windings are energized determines the direction of rotation of the rotor.

The power drive signals applied to the power transistors in series with power phase windings are pulse width modulated to maintain current levels through the power phase windings at a level to cause the rotor to rotate at the desired RPM while limiting the torque, or current, in the power phase windings to a predetermined maximum. It should be noted that the magnitude of the torque of a motor is a function of the magnitude of the current flowing through its power phase winding circuits. The magnitude of this current flow is sensed and used to produce a current, or torque, feedback signal which is applied to the motor controller.

U.S. Pat. No. 5,075,610, issued Dec. 24, 1991, having inventor William A. Harris, and U.S. Pat. No. 5,196,775, issued Mar. 23, 1993, having inventors William A. Harris, Jay R. Goetz and Kevin J. Stalsberg, and U.S. patent application Ser. No. 08/672,251, filed Jun. 28, 1996, now abandoned, having inventor William A. Harris, are hereby incorporated by reference in the present description.

SUMMARY OF THE INVENTION

The present invention provides a control circuit for use with a switched, or variable, reluctance motor. It can be adapted for association with switched reluctance motors with any number of stator pole pairs. It is capable of connecting a voltage potential in the form of a pulse having a variable duration, across a stator winding of the motor and alternately connecting and disconnecting one end of the stator winding to a connection point of ground potential while the other end of the stator winding is connected to a voltage source. When connected in this manner, a current having a magnitude that is pulse duration modulated, is caused to flow through the stator winding for the purpose of creating a magnetic field at the stator pole and, in turn, creating a magnetic attraction to induce movement of a rotor pole toward that magnetized stator pole. By sequentially connecting and disconnecting the stator windings of the switched reluctance motor in an appropriately selected sequence, the rotor of the switched reluctance motor can be caused to turn at a preselected rotational speed.

The primary advantage of the present invention is that it replaces the pulse width modulation with a pulse duration modulation motor drive system. Only one pulse of signal is required per cycle to drive a phase winding of a switched reluctance motor. Pulse width modulation requires a series of pulses per cycle to drive the phase winding of the motor. The one-time switching per phase-driving of each cycle results in reduced electromagnetic interference (EMI) from phase current noise. Pulse duration modulation also results in overall efficiency improvement of the motor and controller.

BRIEF DESCRIPTION OF THE DRAWINGS

FIGS. 4a, 4b, and 4c illustrate the drive, free wheeling and energy recovery modes of the current flow for pulse duration modulation.

DESCRIPTION OF THE PREFERRED EMBODIMENT

Figure 1:
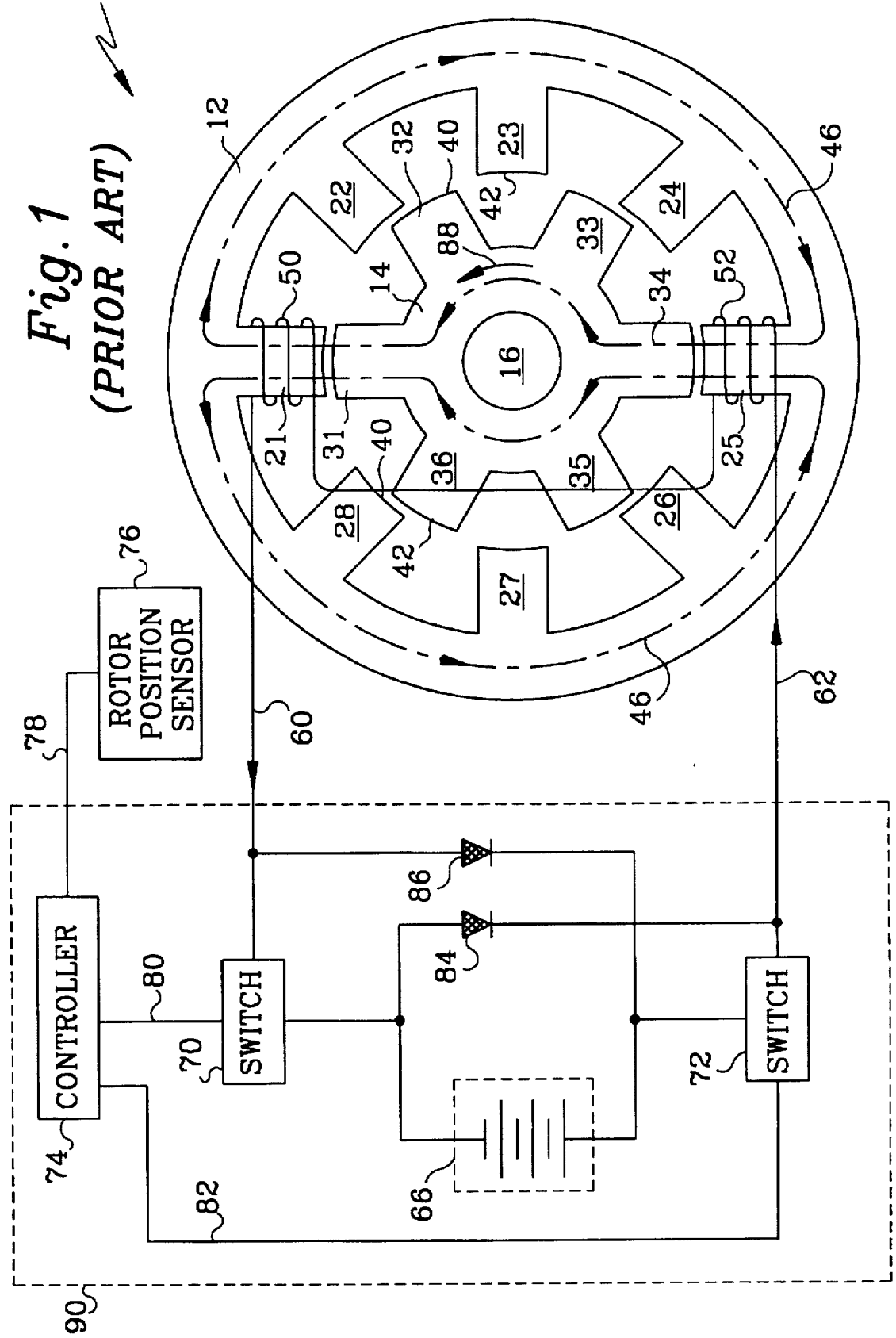
FIG. 1 shows a control circuit and a four-phase switched reluctance motor which may incorporate the present invention.

First, related-art SR motors and the respective controller which the present invention accommodates are briefly described. FIG. 1 shows a switched reluctance motor associated with a control circuit in the art, and illustrates the general operation of a switched reluctance motor, and identifies several basic concepts which are discussed below in conjunction with the description of the present invention. Reference numeral 10 is used to generally identify the schematic illustration of a switched reluctance motor, or to refer to the motor itself. SR motor 10 comprises a stator 12 and a rotor 14 connected to a shaft 16. Both the stator 12 and the rotor 14 each comprise numerous salient poles. The stator poles are identified by reference numerals 21–28 and the rotor poles are identified by reference numerals 31–36. The stator comprises eight poles while the rotor comprises six poles. The stator poles are associated in pairs to create four phases. Salient stator poles 21 and 25 are associated together to form one pole pair, or phase, of four-phase motor 10. These associated poles are generally connected by a single conductor that forms the two stator windings of the phase. The stator windings 50 and 52 are connected together in electrical communication with each other and this pair of stator windings is also connected to a control circuit 90 which comprises a voltage source 66. The schematic diagram of FIG. 1 shows conductors 60 and 62 providing power to windings 50 and 52, respectively.

In most switched reluctance motors, the outer surfaces of the salient rotor poles are shaped to be associated in a concentric association with the inner surfaces of the salient stator poles. In most applications, a very small clearance is provided between these surfaces which are identified by reference numerals 40 and 42. The gap between surfaces 40 and 42 is typically 0.02 centimeter (0.008 inch). Depending on the motor design, the gap maybe between 0.008 centimeter (0.003 inch) and 0.05 centimeter (0.02 inch). The overall diameter for the typical motor 10 is about 13 cm. (5 in.) and the diameter of the rotor, including the poles is about 8 cm. (3 in.). of course, various SR motors may be designed with various other dimensions.

When a current is caused to flow through conductors 60 and 62, stator windings 50 and 52 create a magnetic field such as that illustrated by the exemplary lines of flux identified by reference numeral 46. The creation of magnetic field 46 attracts the salient rotor pole which is most proximate the magnetized stator pole. In this particular example, rotor poles 31 and 34 are magnetically attracted toward alignment with stator poles 21 and 25, respectively. Alternatively, if stator poles 22 and 26 were caused to create a magnetic field by the flow of electrical current through their associated stator windings (not shown in FIG. 1), the resulting magnetic attraction would attract rotor poles 32 and 35 toward alignment with stator poles 22 and 26, respectively. This would result in a rotation of rotor 14 in the direction indicated by arrow 88. Naturally, if stator poles 22 and 26 were energized in this manner, it would be appropriate to de-energize stator windings 50 and 52 to eliminate the magnetic attraction that would tend to hold rotor poles 31 and 34 in the position shown in FIG. 1.

The control circuit 90, in circuits generally known to those skilled in the art, comprises a voltage source 66 and a pair of switches, 70 and 72, which are controlled by the controller 74 with signals conducted through lines 80 and 82. The controller selectively opens and closes switches 70 and 72, or other switches associated with other phases, in response to a preselected sequential pattern and in response to signals received on line 78 from a rotor position sensor 76. It should be understood that when a stator winding pair, such as that indicated by reference numerals 50 and 52 in FIG. 1, is energized with a current flowing through it, the inductive characteristic of the stator winding will tend to resist a sudden cessation of current flowing through the winding when it is disconnected from the voltage source 66. In typical control applications, alternative circuits such as those shown in FIG. 1 in association with diodes 84 and 86, are provided to permit the induced current flow to circulate after the stator winding is disconnected from the power source. The operation of control circuit 90 shown in FIG. 1 is not described in greater detail because of its generally known characteristics.

Figure 2:
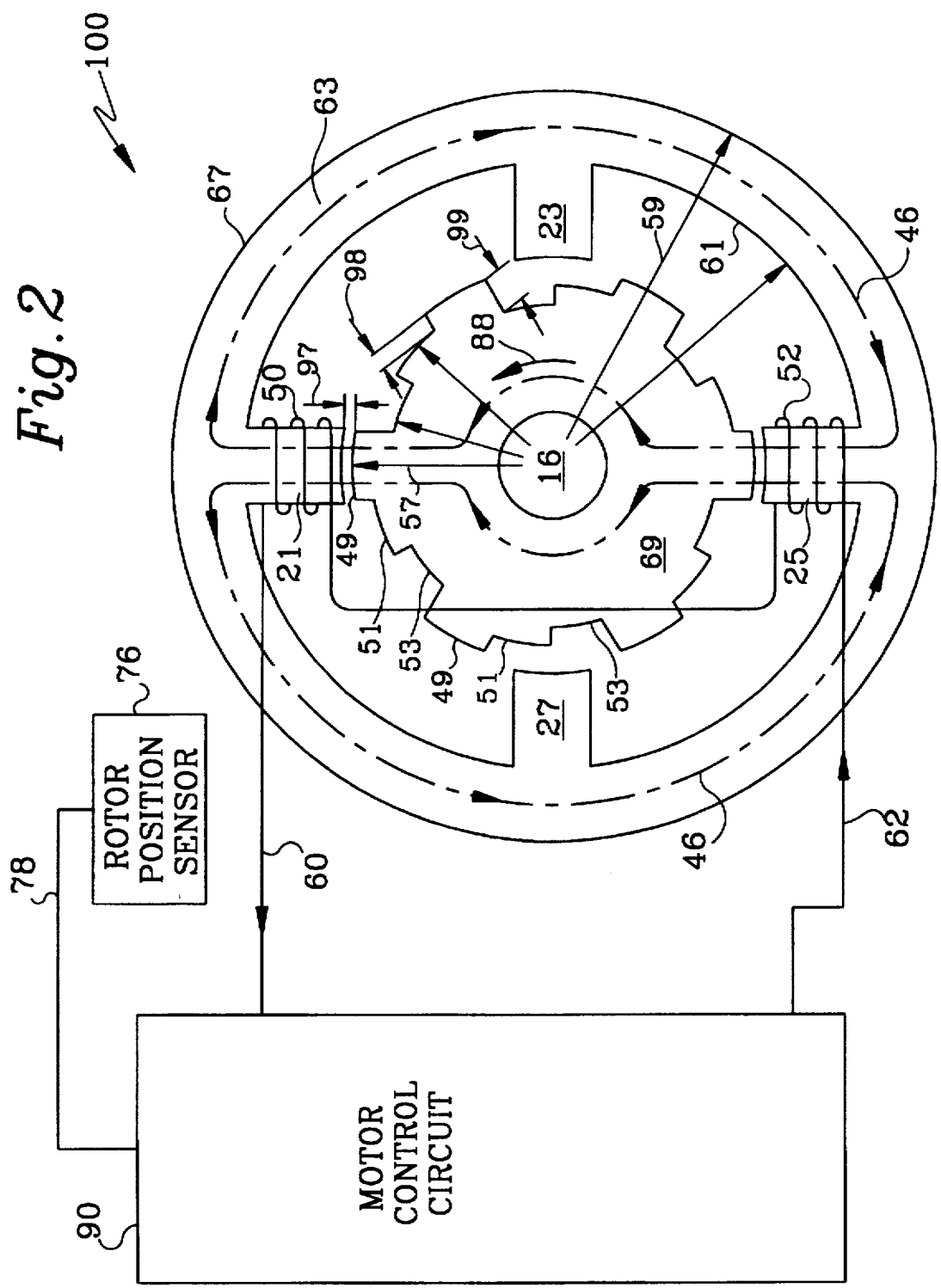
FIG. 2 illustrates a switched reluctance motor having a stepped-gap rotor that maybe controlled by a control circuit having the present invention.

FIG. 2 illustrates, though not to scale, a switched reluctance motor 100 having a stepped-gap rotor 69 situated on center shaft 16. The gaps of interest are the distances 97 between, for instance, the end face of the stator poles and the end faces of rotor poles 49. The smallest gaps 97 are between the end faces of a first set of rotor poles 49, and the end faces of stator poles 21, 23, 25 and 27, when the respective rotor pole is aligned with a stator pole such that the maximum flux 46 can flow when the respective winding of the stator pole is conducting a specified current. Such gaps 97 are about 0.18 millimeter (0.007 inch). A group of larger gaps (i.e., distance 97 plus distance 98) exists between the end faces of a second set of rotor poles 51, and the end faces of stator poles 21, 23, 25 and 27, when the respective rotor pole is aligned with the closest stator pole. Such gaps (97+98) are about 0.20 millimeter (0.008 inch). Another group of even larger gaps (i.e., distance 97 plus distance 99) exists between the end faces of a third set of rotor poles 53, and the end faces of stator poles 21, 23, 25 and 27. Such gaps (97+99) are about five millimeters or 0.2 inch. Each of the end faces of rotor poles 49 has a surface that follows the curve of a radius 57 of about 25 millimeters (one inch) from the center of shaft 16.

Typically, inside surface 61 of stator 63 has a radius 65 of about 35 millimeters (1.4 inches), and outside surface 67 has a radius 59 of about 50 millimeters (two inches). For motors having sizes different than the one disclosed here, all size changes would be proportional except the gap distances or sizes which would increase ten percent for a doubling of the other dimensions, or decrease ten percent for a fifty percent decrease in the other dimensions. Other variations of size would follow these proportional changes in dimensions.

The typical angular displacement of rotor 69 poles 49 is about 17 degrees and the angular displacement for poles 51 is about 17 degrees. The angular displacement for poles 53 is about 26 degrees. The angle for a set of three adjacent poles is 60 degrees and, of course, 360 degrees for all of the six major rotor pole areas. These dimensions are presented to illustrate the concept of the invention. In practice, the gap ratio, pole angular displacements and radial dimensions are varied to adjust torque ripple, average torque and torque/speed characteristics.

Functionally, motor 100 is a two phase motor having six complex poles on rotor 69. Each of the complex poles has three poles 49, 51 and 53, respectively. The arrangement of the stepped gap of the complex poles indicates a direction 88 of the motor when electrical power is appropriately applied to the windings of each pair of stator poles 21 and 25, and 23 and 27, respectively. There is no angular position where rotor 69 has no torque when the motor functions as described here. There is a significant fraction of the maximum torque at the minimum torque position of rotor 69. The torque ripple of this two-phase stepped-gap rotor motor 100 approaches that of four-phase motor 10 of FIG. 1. A motor control circuit for the present two-phase motor 100 uses half of the number of voltage and electrical power components than the control circuit for the four-phase motor 10. Further, two-phase motor 100 has one-half the number of stator poles and windings than four-phase motor 10. Motor control electronics for motor 100 is design-wise and functionally similar to the control electronics for motor 10 of FIG. 1.

Figure 3A:
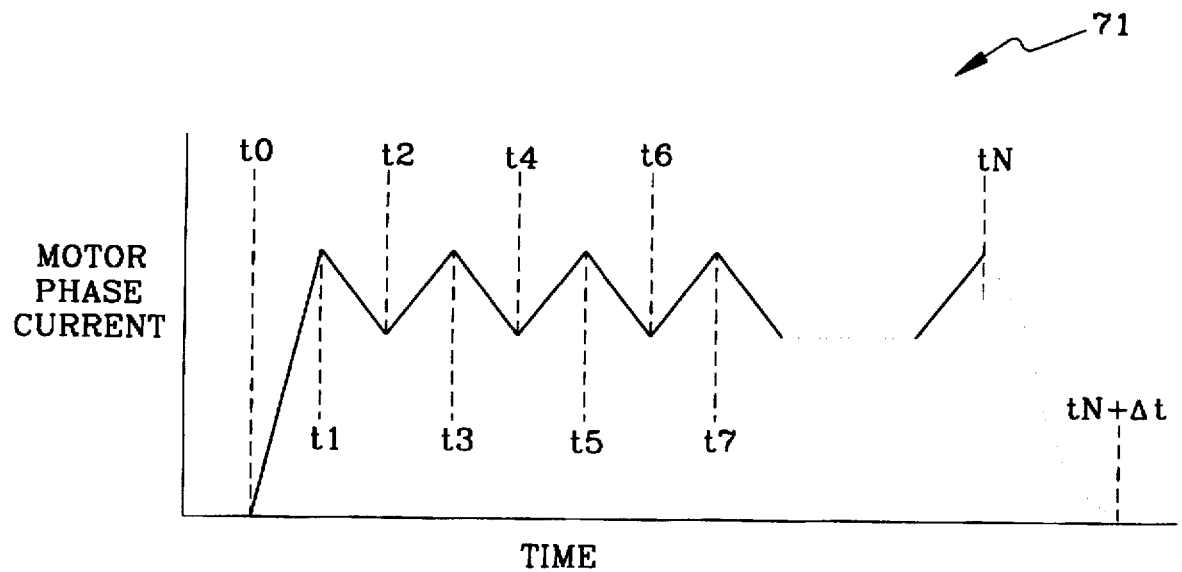
FIGS. 3a and 3b show pulse width and pulse duration modulation waveforms, respectively.
Figure 3B:
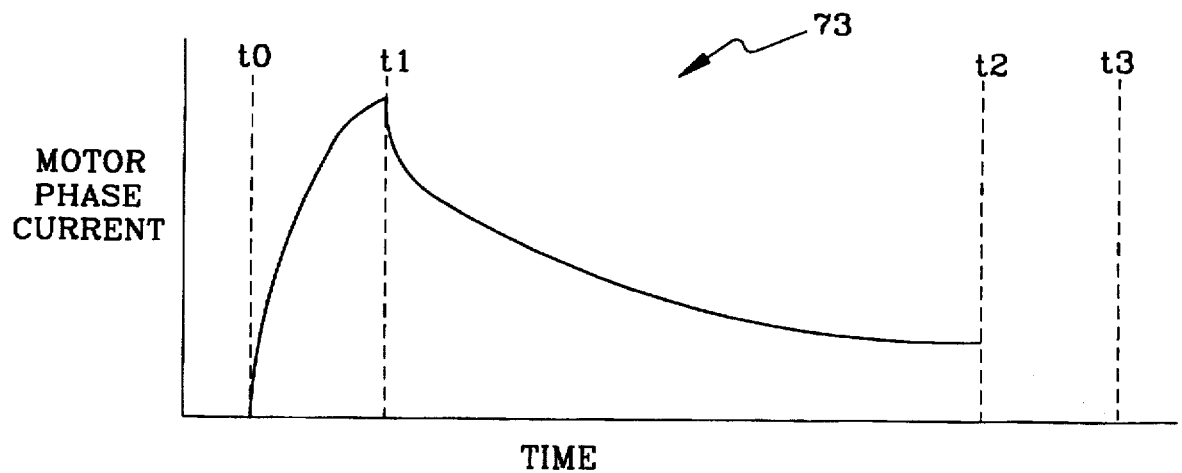

The present invention is described relative to the four-phase motor of FIG. 1, even though it is evident with the present description in conjunction with different kinds of SR motors having other numbers of phases and/or different structures such as the stepped-gapped motor shown in FIG. 2. The energizing current typically applied to windings 50 and 52 of motor 10 has a waveform 71 as shown in FIG. 3a. The amount of current needed for a given set of windings 50 and 52, is varied by widening or narrowing the pulse width of current waveform 71 by switching according to a number of clock pulses 68 (FIG. 5) having increments of switching on and off as indicated by t1, t2, t3, t4, t5, t6, t7, . . . tN, respectively. The current is switched on during periods of t0 to t1, t2 to t3, t4 to t5, t6 to t7 and so on. During the periods of t1 to t2, t3 to t4, t5 to t6, and so on, the current in the respective windings is freewheeling which is discussed below. During the period from tN to tN to tN+Δt, there is energy recovery which is also noted below. FIG. 3b reveals a current waveform 73 of the present invention.

There is only one switching in current waveform 73. The current is switched on at t0 and switched off at t1. From t1 to t2, the current is freewheeling. From t2 to t3, is the energy recovery period. The amount of current needed by windings 50 and 52 is satisfied by the magnitude of the pulse 73 at t1, and the period or duration of freewheeling from t1 to t2 which is varied by the controller. The one switching of the pulse of waveform 73 for each phase as opposed to a series of switchings results in more efficiency in power consumption by an SR motor 10 operated with the present pulse duration modulation of FIG. 3b when compared to motor 10 operated with the pulse width modulation of FIG. 3a, despite the higher amount of current magnitude of PDM waveform 73.

By way of comparison to related art, FIG. 3a shows a current diagram of the related art design using pulse width modulation. Comparing FIGS. 3a and 3b, it can readily be seen that the energy required for the same speed and torque is much less with the present invention, in view of the "on-time" portion in the areas under the curves 71 and 73. The previous design has a variable number of mini-pulses for one variable width regular pulse resulting in significant electromagnetic interference (EMI), as opposed to the more advantageous one mini-pulse for one regular pulse having a variable duration in the present invention.

The effectiveness of the current on the power of motor 10 is in proportion to the square of the current magnitude of the pulse, thus increasing the efficiency of the SR motor. Note that motor torque is defined by $T = K I^2 dL/d\theta$, where K is a constant which is a function of motor structure, I is current which is proportional to motor torque and/or speed, and $dL/d\theta$ is the rate of inductance change of the winding for a certain change of rotor position, that is, RPM. By allowing the current in each phase to reach its maximum for a given speed and/or torque request, efficiency is improved.

FIGS. 4a, 4b and 4c illustrate the current drive, freewheeling and energy recovery modes, respectively, of circuit 105 which includes motor 10 windings 50 and 52 and switching FETs 75 and 77. In the drive mode, at time t0, both switches 75 and 77 (e.g., FETs) are turned on via 100 ohm resistors 85 and 87 of the high side and low side drives, respectively, and the current of waveform 73 (FIG. 3b) increases, for instance, phase A having windings 50 and 52, until time t1, where upon switch 75 of a high side drive, is turned off for the remainder of the cycle for phase A. The current flow, as indicated by line 79, during the drive mode, is from +V terminal 89, through switching FET 75, windings 50 and 52, switching FET 77 and resistor 81, on to ground terminal 83.

Upon the switching off of FET 75, during the period from t1 to t2, the current flow freewheels, due to the effect of the inductance of windings 50 and 52, in that it continues to flow along another path as indicated by line 91, from ground terminal 93 through diode 92, windings 50 and 52, switching FET 77 and resistor 81, on to ground terminal 83. At time t2, the "freewheel" portion for this phase is complete when switching FET 77 is turned off via resistor 87 and the gate of FET 77.

At t2 there is stored energy remaining in windings 50 and 52 for this phase, and an energy recovery occurs. At this stage, the current flows from terminal 93 through diode 92, windings 50 and 52, diode 94 and on to +V terminal 89, as indicated by line 95, thereby recovering the stored energy. This energy recovery continues until t3. The duration of the "on-time," from t0 to t1, can vary from zero to 100 percent of the cycle time which is from t0 to t2. This time is set by a particular speed request or a torque request provided to controller electronics 96 and pulse duration circuit 97 of FIG. 6.

Figure 5:
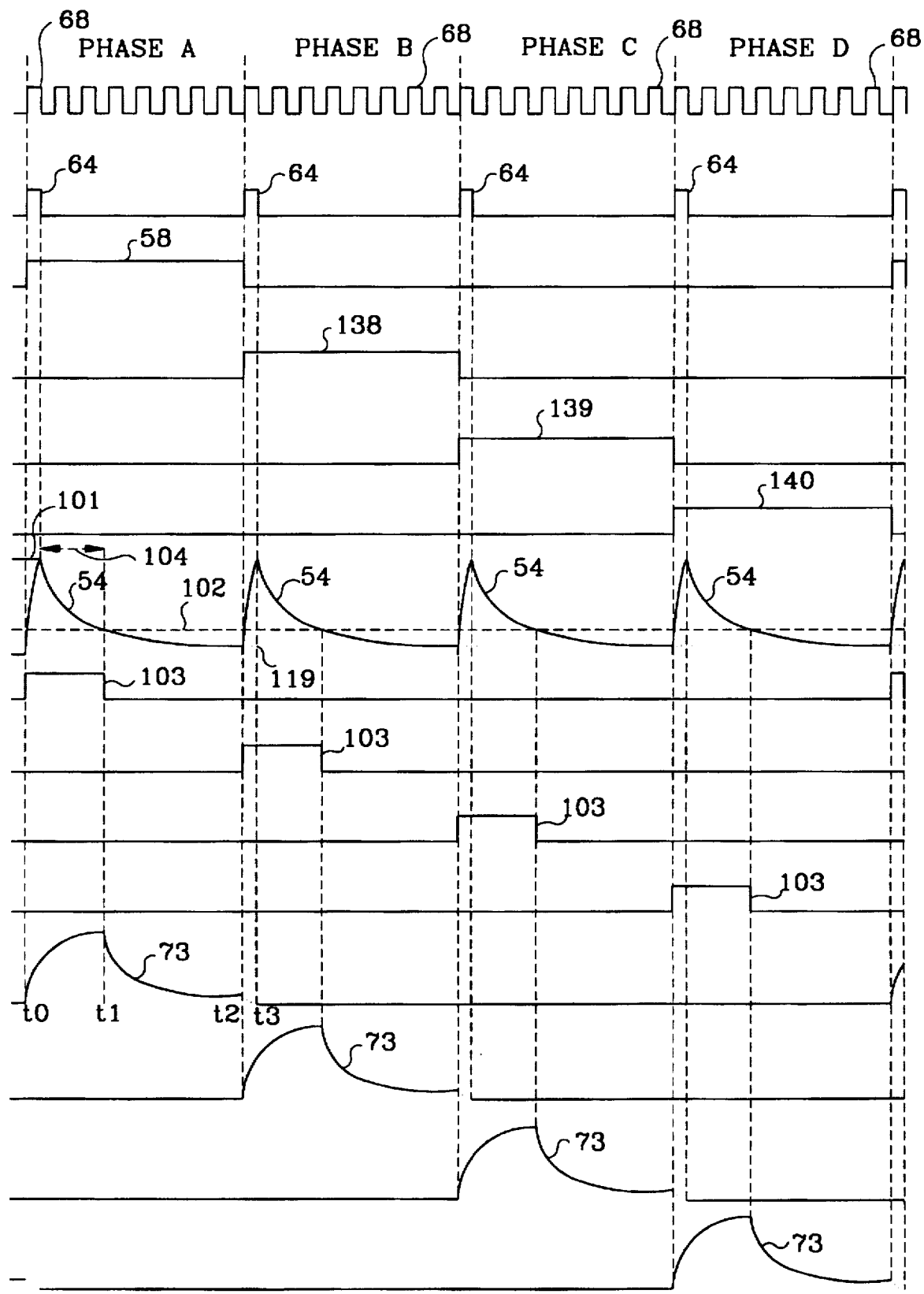
FIG. 5 is a timing diagram of significant signals for pulse duration modulation.

FIG. 5 is a timing diagram for the pulse duration current drive of the present invention for four-phase SR motor 10 shown in FIG. 1. Similar timing diagrams may be derived from this diagram for pulse duration current modulation for SR motor having more or less than four phases. Waveform 68 is a clock that outputs 32 pulses for each cycle which includes providing current sequentially for the four phases A, B, C and D of motor 10. There are eight pulses per phase. The leading edge of each low side drive signal (58, 138, 139, 140), allows the gating of one clock signal 68 to produce signal 64. Each low side drive signal (58, 138, 139, 140) is connected to its respective low side switching FET 77, which is turned on for the whole duration of the respective phase. Pulse 64 also charges a capacitor 56 of FIG. 7. A waveform 54 shows the voltage across capacitor 56. Capacitor 56 is charged up to a positive voltage 101 and then begins to discharge at the trailing edge of pulse 64, and continues to discharge with its voltage passing through a zero voltage level 102 to a negative voltage. As capacitor 56 begins to charge and its voltage exceed level 102, it turns on a high side drive signal 103 that turns on switching FET 75 for the current drive mode of winding 50 and 52 of the respective phase. Signal 103 stays on even during the discharge of capacitor 56 as long as the voltage on capacitor 56 is positive during time period 104. While high signal 103 is on, current is driven through windings 50 and 52. Signal 103 turns off as voltage waveform 54 of capacitor 56 goes negative. The drive mode then ends and the freewheeling mode begins and continues until waveform 58 goes to zero at the end of the respective phase. Current waveform 73 of FIG. 5 shows the drive mode between t0 and t1 and the freewheeling mode between t1 and t2. The energy recovery mode occurs for a short period after the respective phase ends, between t2 and t3. The torque or speed of motor 10 is varied according to a difference or error between the actual torque or speed and the set or desired torque or speed. Whether torque or speed is used as a parameter for motor control depends on the application or use of the motor. The difference or error between the set and actual torque or speed is put in a form of a signal that affects the discharge of capacitor 56 after the occurrence of the trailing edge of pulse 64. If the difference or error signal slows down the discharge for an increased duration 104, then waveform 103 is on longer and the current drive mode of waveform 73 results in a larger current pulse to windings 50 and 52 which results in more torque or speed from motor 10. If the difference or error signal speeds up the discharge for a decreased duration 104, then waveform 103 is on for a shorter period of time and the current drive mode of waveform 73 results in a smaller current pulse to windings 50 and 52 which results in less torque or speed from motor 10.

Figure 6:
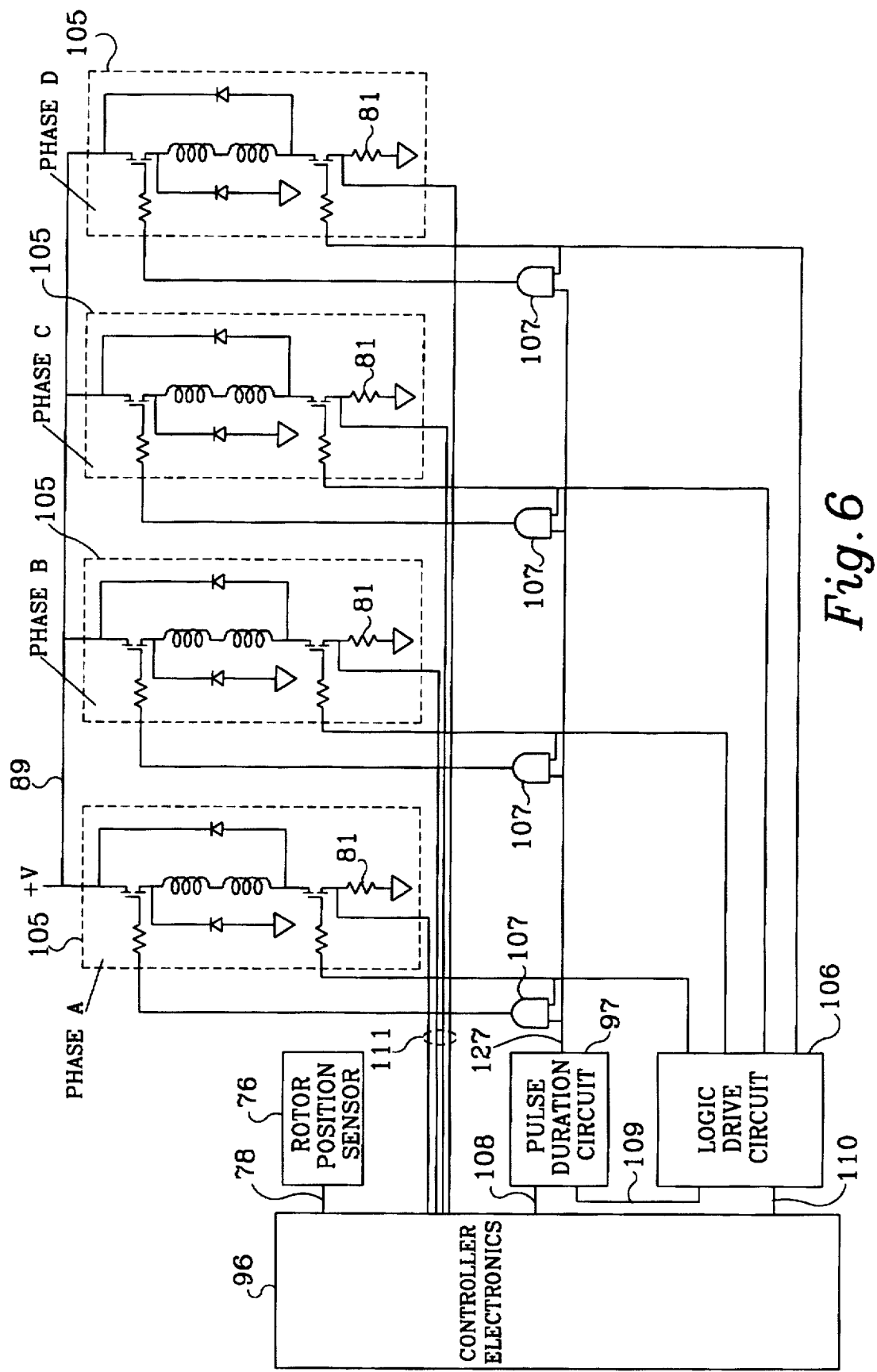
FIG. 6 is a diagram of the pulse duration modulation scheme for the SR motor.

FIG. 6 shows an overall block diagram of the pulse duration modulator for SR motor 10. Circuits 105 are shown for phases A, B, C and D of a four-phase motor 10. Logic drive circuit 106, which includes counters such as a 32 bit counter, drivers and other logic and electronic devices, provides low side drive signals 58 to circuits 105 of the four phases. Pulse duration circuit 97 provides high side drive signals 103 to circuits 105 via AND gates 107 for the four phases. Gates 107 multiplex the 103 signals to the proper circuit 105 of the respective phase having the drive and freewheel modes. High side drive signal 103 can go to the respective circuit 105 only if low side drive 58 is going to circuit 105 because of the respective AND gate 107. Line 108 provides the speed or torque indications and settings from controller electronics 96 to pulse duration circuit 97. Line 109 provides logic charge pulse 64 from logic drive circuit 106 to pulse duration circuit 97. A pulse of waveform 68 is sent via line 110 from controller electronics 96 to drive circuit 106. Lines 111 provide voltage signals indicative of the magnitude of current flowing through windings 50 and 52 during current drive and freewheeling modes 79 and 91, respectively, to controller electronics 96. The current of windings 50 and 52, flowing through a 0.025 ohm resistor 81 provides the voltage drop for line 111 current sense signals which are indicative of the current magnitudes from t0 to t2 of the respective phase. The value of resistor 81 is based on the maximum current for motor 10. Rotor position is noted by sensor 76 and indicated by a signal on line 78 to electronics 96.

Figure 7:
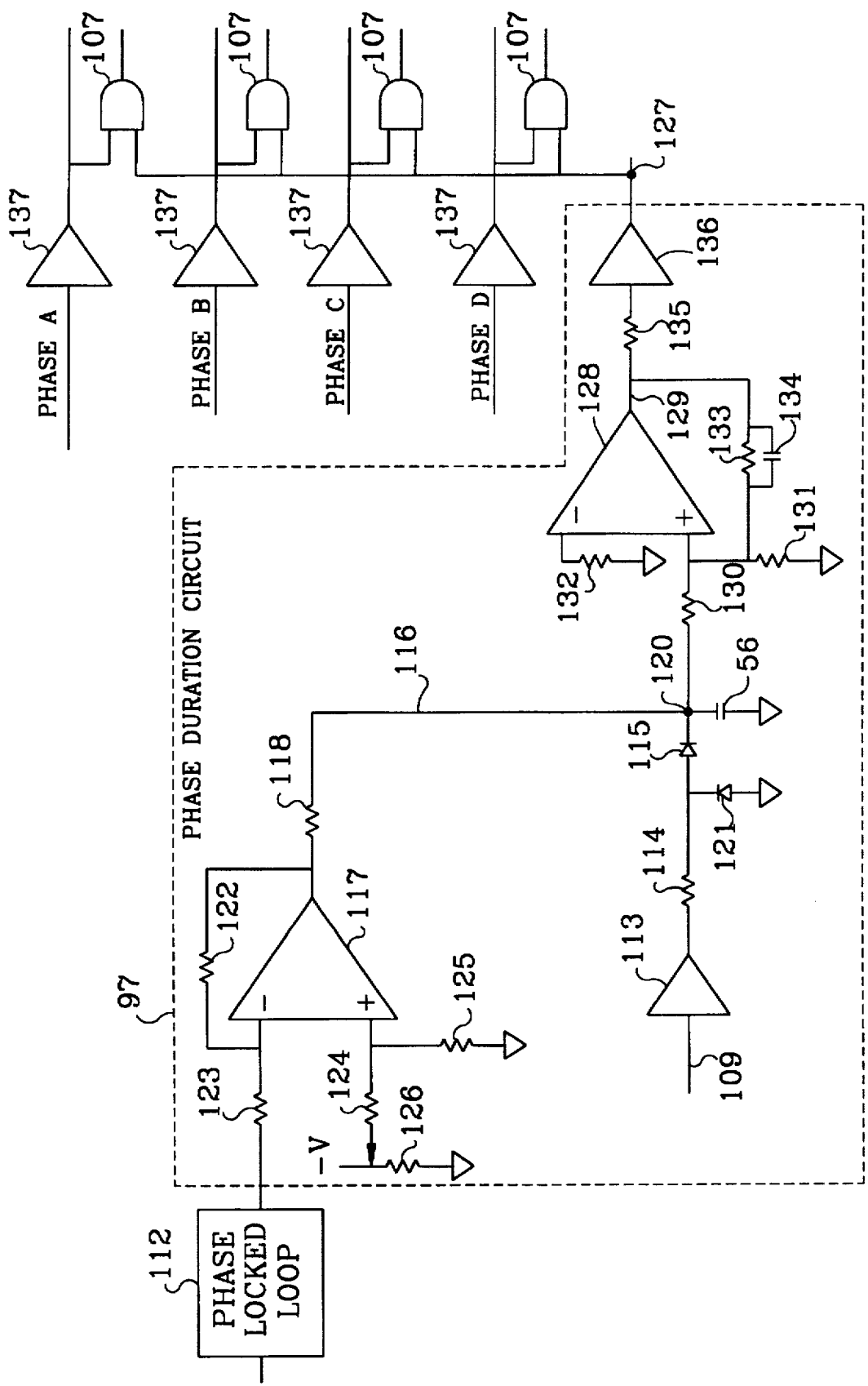
FIG. 7 is a schematic for the pulse modulation circuit.

FIG. 7 is a schematic of pulse duration circuit 97. From logic drive circuit 106 is pulse signal 64 along line 109 to driver amplifier 113. Pulse 64 at the output of amplifier 113 goes through a 1000 ohm resistor 114 and diode 115 to charge up capacitor 56 to voltage level 101 during the period of pulse 64. Then capacitor 56 is free to discharge after the trailing edge of pulse 64. The rate or the duration of the discharge of capacitor 56 from voltage level 101 to level 102 is controlled by a signal on line 116 via a 33 kilohm (i.e., 33 thousand ohms) resistor 118 from the output of differential amplifier 117. If signal 116 maintains the voltage level on capacitor 56, the capacitor will not discharge by the end of the respective phase, and high side drive signal 103 and consequently the current drive mode 79 of signal 73 will continue for the whole duration of the respective phase. If signal 116 decreases the voltage level on capacitor 56 significantly, the capacitor will discharge long before the end of the respective phase, and high side drive signal 103 and consequently the current drive mode 79 of signal 73 will continue, if at all, for only a very small fraction of the duration of the respective phase. Capacitor 56 discharges to a voltage level 119 below the zero voltage level 102. The voltage level 119 at point 120 is limited by the voltage drops of diodes 115 and 121 connected in series to ground.

Device 117 is a model TL082 operational amplifier by Linear Technology Inc. Other kinds of operational amplifiers may be used instead. A 100 kilohm feedback resistor 122 is connected between the output and the inverting input of amplifier 117. The actual speed or torque of motor 10 is input from a phase locked loop circuit 112 via a 10 kilohm resistor 123 to the inverting input of amplifier 117. The signal from circuit 112 is a negative voltage having a magnitude representative of the actual speed or torque. A setting signal of desired speed or torque is input via a 10 kilohm resistor 124 to the non-inverting input of amplifier 117. A 10 kilohm resistor 125 is connected between the non-inverting input of device 117 and ground. The setting signal has a negative voltage potential which is determined by an adjustment of a 20 kilohm potentiometer 126. The adjusting or pickoff point of potentiometer 126, which determines the desired speed or torque of motor 10, is connected to resistor 124. The other two ends of the resistor of potentiometer 126 are connected to a negative voltage and ground, respectively. The output of amplifier 117 indicates the difference between the actual speed or torque and the desired speed or torque. This difference is referred to the speed or torque error signal that goes to terminal 120 of capacitor 56.

At the beginning of each phase firing, i.e., the occurrence of pulse 64 on line 109 via amplifier 113, resistor 114 and diode 115 at terminal 120 charges capacitor 56 to a voltage 101 above ground. Capacitor 56 then outputs a high signal which is the first portion of waveform 54. At the end of the charge cycle for capacitor 56 when the logic signal 64 goes low, the voltage at terminal 120 will decay at a rate determined by the values of resistor 118 and capacitor 56, and the magnitude of the speed error voltage from the output of amplifier 117. As noted above, the more negative the speed error signal is, the faster the voltage at terminal 120 will decay thereby resulting in a shorter pulse 103 at terminal point 127. When the voltage at point 120 goes below the zero voltage 102, a comparator 128 switches its output on line 129 from a high to a low signal thereby turning off the high side drive signal 103 for FET 75. Signal 54 from terminal 120 goes through a 100 kilohm resistor 130 on to the non-inverting input of amplifier or comparator 128. The non-inverting input is connected to ground through a 10 kilohm resistor 131. The inverting input of comparator 128 is connected to ground through a 10 kilohm resistor 132. To effect amplifier 128 as a comparator, a positive feedback loop from the output to the non-inverting input is implemented via a 1.5 megohm (i.e., 1.5 million ohms) resistor 133 and a 47 picofarad capacitor 134 connected in parallel with each other. Signal 103 from comparator goes through a 20 kilohm resistor 135 and driver 136 to put signal 103 at terminal 127 which is connected to gates 107. Drivers 137, which are apart of logic drive circuit 106, buffer low side signals 58 destined for AND gates 107 and transistors 77 of circuits 105 for the respective phases of motor 10.

Control electronics 96 encompasses counters and associated devices in the related art for accepting signals from lines 78 and 111, processing these signals and providing pulse signals 68 indicative of rotor speed, phase start pulses 64 which are synchronized to rotor 16 position, and phase low side drive signals 58 indicative of current active phase. The timing of start pulse 64 relative to rotor 16 can be varied while motor 10 is functioning for desired or optimal performance. The above-described embodiment is only one of several ways for implementing the invention.

I claim:

1. A pulse duration width modulated switched reluctance motor comprising:
   at least first and second pairs of stator poles on a stator, wherein each pair of stator poles has a pair of windings;
   at least first and second pairs of rotor poles on a rotor, wherein the rotor is positioned and rotatable within the stator; and
   a motor control circuit connected to the pairs of windings wherein the motor controller comprises:
      a switch connected to each pair of windings and to an electrical power source, and
      a pulse duration circuit connected to each switch connected to each pair of windings, wherein the pulse duration circuit comprises:
         a capacitor that is connected to a logic drive circuit;
         a speed/torque error indicator connected to the capacitor;
         a comparator connected to the capacitor; and
         a set of gates connected to the comparator and to each switch.

2. The pulse duration width modulated switched reluctance motor of claim 1, wherein:
   the motor has a respective phase of operation corresponding to each pair of windings;
   the capacitor is charged up upon receipt of a start pulse from the logic drive circuit, at the beginning of each phase of operation;
   the time of discharge of the capacitor is determined by an error signal from the speed/torque error indicator;
   the comparator has an output that is at a logic high when the capacitor has a charge on it, and the output is a logic low when the capacitor is discharged, thereby resulting in a pulse that has a duration width correlating to a time that the capacitor has a charge on it, for each respective phase of operation; and
   the switch connected to the pair of windings corresponding to the respective phase of operation, is on during the pulse from the comparator, thereby providing a current pulse during the pulse from the comparator, to the windings.

3. A pulse duration modulator for a switched reluctance motor, comprising:
   selection means for outputting an error signal indicating a difference between selected speed/torque and actual speed/torque of the switched reluctance motor;
   initiating means for determining when a motor winding needs current to maintain rotation of a rotor of the motor, and thus outputting an initiating pulse;
   storage means, connected to said selection means and to said initiating means, for receiving a charge from the initiating pulse, maintaining at least a portion of the charge for a duration of time determined by the error signal;
   comparator means, connected to said storage means, for outputting a comparator pulse having a duration for a period of time that said storage means has at least a portion of the charge; and
   switching means, connected to the motor winding and to said comparator means, for providing a current pulse to the motor winding for a duration approximately equivalent to the duration of the comparator pulse.

4. A method for pulse duration modulation for a switched reluctance motor, comprising the steps of:
   determining the actual speed/torque of the switched reluctance motor;
   selecting the desired speed/torque of the motor;
   comparing the actual speed/torque with the desired speed/torque;
   providing an error signal representing a difference between the actual speed/torque and the desired speed/torque;
   providing a start signal when a winding of the motor needs current to maintain rotation of a rotor of the motor;
   storing a charge of the start signal in a storage device;
   discharging the charge from the storage device in accordance with the error signal; and
   providing a current pulse to the winding of the motor wherein the current pulse has a duration equivalent to a period of time that the storage device has the charge.

5. The method of claim 4 wherein the steps are repeated.

* * * * *